(12) United States Patent
Renick et al.

(10) Patent No.: US 9,091,160 B2
(45) Date of Patent: Jul. 28, 2015

(54) FLOWBACK SEPARATION SYSTEM

(76) Inventors: Michael Renick, Kountze, TX (US);
Justin Renick, Kountze, TX (US)

( * ) Notice: Subject to any disclaimer, the term of this patent is extended or adjusted under 35 U.S.C. 154(b) by 968 days.

(21) Appl. No.: 13/135,044

(22) Filed: Jun. 23, 2011

(65) Prior Publication Data
US 2012/0325751 A1    Dec. 27, 2012

(51) Int. Cl.
| | | |
|---|---|---|
| *B01D 17/02* | (2006.01) | |
| *B01D 17/12* | (2006.01) | |
| *B01D 21/30* | (2006.01) | |
| *C02F 1/02* | (2006.01) | |
| *C02F 9/00* | (2006.01) | |
| *E21B 43/25* | (2006.01) | |
| *E21B 43/26* | (2006.01) | |
| *E21B 21/06* | (2006.01) | |
| *B01D 19/00* | (2006.01) | |
| *B01D 21/00* | (2006.01) | |

(52) U.S. Cl.
CPC ............... *E21B 43/26* (2013.01); *B01D 17/02* (2013.01); *B01D 17/12* (2013.01); *B01D 19/0063* (2013.01); *B01D 21/0039* (2013.01); *B01D 21/302* (2013.01); *C02F 1/02* (2013.01); *C02F 9/00* (2013.01); *E21B 21/063* (2013.01); *E21B 21/067* (2013.01); *E21B 43/25* (2013.01); *C02F 2209/008* (2013.01); *C02F 2209/42* (2013.01)

(58) Field of Classification Search
CPC ............... B01D 17/02; B01D 17/0208; B01D 17/0211; B01D 17/0214; B01D 17/12; B01D 19/00; B01D 19/0063; B01D 21/0039; B01D 21/0042; B01D 2021/0078; B01D 21/30; B01D 21/302; B01D 21/063; B01D 21/067; B01D 43/00; B01D 43/25; B01D 43/26; E21B 21/063; E21B 21/067; E21B 43/25; E21B 43/26; E21B 43/02; C02F 1/02; C02F 9/00; C02F 9/005; C02F 2209/005; C02F 2209/008; C02F 2209/03; C02F 2209/40; C02F 2209/42
USPC ......... 210/85–87, 90, 94, 143, 180, 182, 188, 210/170.01, 241, 259, 521, 739; 166/267, 166/305.1, 308.1, 53; 175/66, 206, 207
See application file for complete search history.

(56) References Cited

U.S. PATENT DOCUMENTS

| | | | |
|---|---|---|---|
| 4,534,869 A * | 8/1985 | Seibert ........................ 210/788 |
| 5,173,092 A * | 12/1992 | Rudder ..................... 210/747.7 |
| 7,699,988 B2 | 4/2010 | McGuire | |
| 7,807,047 B2 | 10/2010 | Randal | |
| 8,097,128 B1 * | 1/2012 | Sherry .......................... 203/11 |
| 8,216,459 B2 * | 7/2012 | Mallonee et al. ............. 210/182 |
| 8,409,442 B2 * | 4/2013 | Booth ........................... 210/650 |
| 8,790,517 B2 * | 7/2014 | Wiemers et al. ............. 210/739 |
| 2002/0134550 A1 | 9/2002 | Leeson | |

(Continued)

OTHER PUBLICATIONS

212 Resources Corporation, 2007, US. (3 pages).

*Primary Examiner* — Joseph Drodge

(57) ABSTRACT

Embodiments disclosed herein may provide for a method of performing a separation process, where the method may include the steps of transporting a single-skid separation unit to a worksite; performing downhole operations at the worksite; recovering a waste stream into the single-skid separation unit, wherein the waste stream may result from performing the downhole operations; and using the single-skid separation unit to separate the waste stream into at least one of an aqueous phase, an organics phase, and a gas phase.

10 Claims, 7 Drawing Sheets

(56) References Cited

U.S. PATENT DOCUMENTS

| | | | |
|---|---|---|---|
| 2003/0192693 A1* | 10/2003 | Wellington | 166/267 |
| 2004/0112822 A1 | 6/2004 | Saik | |
| 2006/0225925 A1* | 10/2006 | Ivan et al. | 175/66 |
| 2007/0289911 A1* | 12/2007 | Cymerman et al. | 210/195.1 |
| 2008/0149542 A1* | 6/2008 | Bjornson et al. | 210/137 |
| 2009/0056945 A1 | 3/2009 | Minnich | |
| 2009/0230059 A1* | 9/2009 | McGuire et al. | 210/638 |
| 2010/0038318 A1* | 2/2010 | Gilmour et al. | 210/709 |
| 2010/0314327 A1* | 12/2010 | Lean et al. | 210/738 |
| 2010/0319923 A1* | 12/2010 | Slabaugh et al. | 166/308.1 |
| 2011/0259584 A1* | 10/2011 | Broussard, II | 166/271 |
| 2014/0262233 A1* | 9/2014 | Keizer et al. | 166/250.01 |

* cited by examiner

FLOWBACK SEPARATION SYSTEM

BACKGROUND OF DISCLOSURE

1. Field of the Disclosure

Embodiments disclosed herein generally relate to systems and methods usable to separate various constituents of fluids produced from a formation. Specific embodiments are directed to a versatile, all-in-one process skid usable to receive or extract energy from a producing formation, such as flowback from a fracturing recovery process. The skid may be provided with monitoring (e.g., remote monitoring) and control capabilities to evaluate real time process performance, and in various embodiments, to enable unmanned operation of the system. In particular embodiments, the skid may include a first inlet separator, a line heater with high-pressure coils, a 2-phase separator, and/or a 3-phase separator, as well as other monitoring devices.

2. Background

Various formation stimulation techniques, and in particular, fracturing techniques, have increased in use as the economic incentive to recover hydrocarbons and other fluids from marginally producing formations has grown. One estimate shows that 90% of natural gas wells in the United States use a fracturing process to produce gas at economically affordable rates. Fracturing operations are usable to overcome deficiencies in the recovery process that result from limited formation permeability, which prevents formation fluids from being readily and easily produced. As exploration for hydrocarbons within unconventional shale plays and other sources that generally require fracturing operations increases, the pressure and volume of fracturing fluid used during typical operations has risen sharply.

Referring to FIG. 1, conventional fracturing techniques 100 typically involve injection of a high-pressure fracturing fluid from a source 101 into a formation 107, such that the fracturing fluid initiates and propagates a fracture 180 in the formation that increases formation permeability and improves the flow path for formation fluids. Highly permeable proppant materials entrained in the fracturing fluid maintain the fracture, e.g., "propping" the fracture open, so that an increase in recovery of hydrocarbons may be achieved. Proppant materials can include, for example, sand, ceramic beads, glass beads, etc.

In a single well fracturing process, thousands or even hundreds of thousands of pounds of proppant material can be used, as well four million gallons of water, or more. As such, there is a significant consumption of materials and a significant generation of waste that occurs as a result of a fracturing process. During a more intensive fracturing operation, e.g., to produce from an unconventional shale play, an even larger quantity of proppant, water, and other materials can be used.

Accordingly, a final step of a fracturing process, can include the recovery of the injected fluids, which occurs by flowing or lifting the well (e.g., energy recovery), also referred to as "flowback" FL. When the flowback recovery process 190 begins, at least a portion of the injected fracturing fluid or flowback FL is produced from the formation 107 and processed by a flowback processing system 102. The flowback stream generally contains an oil/water mixture, along with a variety of other contaminants carried therein. The contaminants may include, for example, other hydrocarbons, such as $C_1$-$C_6$ light hydrocarbons, $C_{20}$ and greater hydrocarbons, gelling additives, as well as other contaminants, including organometals and the like, in addition to proppant materials.

Raw materials consumed during fracturing processes, such as water, are extremely valuable resources that must often be conserved where possible due to various laws or regulations. For example, water used to make fracturing fluid may be available from local streams and ponds, or purchased from a municipal water utility; however, the use of such water can be extremely expensive due to the permits required. Alternatively, tanker trucks can be used to transport water to a well site; however, due to the fact that many oil and gas fields are in remote locations, transportation of water to a well site, along with proppant material and other required materials and/or equipment, can be prohibitively expensive.

One method to conserve materials consumed by fracturing operations includes separation, cleaning, and recycling of the flowback fluid. On-site processing equipment used at a well location is the most common means by which materials are recycled. There is also interest in the industry for recycling and/or separating hydrocarbons from the flowback stream, such as through removal of the contaminants therein. Doing so requires additional separation of the proppant materials and other contaminants from the flowback stream.

In addition to the large quantity of materials consumed by a fracturing operation, the substantial amount of waste generated can be problematic. Previously, recovered waste streams were simply buried underground. However, due to increased public and regulatory scrutiny and pressure, the oil and gas industry has sought to conduct fracturing processes in a manner that is as environmentally benign as possible. Concerns about pollution leaching into the soil and affecting ground water sources have stimulated state and federal legislation that effectively eliminates the ability to bury waste streams. Thus, flowback streams are generally categorized as hazardous waste materials, and must be treated accordingly.

Conventional practices include the use of storage containers to store flowback materials, and the use of tanker trucks to transport the stored materials away from a well site for treatment. For a single well, these practices can require 300 tanker trucks, or more, to carry more than two million gallons of flowback materials for offsite disposal. In addition to transport costs, these trucks and/or storage containers are prone to failure and spilling while in transit, which results in toxic spills and costly environmental hazards. Additionally, the time required to properly interconnect all of the trucks can be inefficient. Due to the rig-up time required, a single fracturing operation may require longer than 45 days to complete.

On-site separation operations typically require "trains" of trucks. The large number of trucks used to provide separation operations, as well as the additional trucks required to support such operations (e.g., to transport waste and/or water), creates significant expense and overhead to when performing fracturing processes. However, these "trains" do not provide means to separate a three-component system of oil, water and sand (or similar proppant material and/or contaminants) into cleansed and recyclable constituent parts. Furthermore, these processes are not self-contained within a single mobile unit, nor do they have control and monitor systems associated therewith that can enable on-site, remote, or even unmanned operation thereof.

Therefore, there continues to be a need for a mobile, all in one, process unit and system capable of providing flowback recovery separation and recycling at a distant and remote location. There is a further need for a flowback recovery process that maximizes the recovery of saleable oil and gas during the recovery phase of a fracturing process. There is also a need for a versatile, all in one, process skid usable to receive or extract energy from a producing formation that is configured to substantially reduce and/or improve the recovery process.

There are additional needs for a system that includes a single mobile unit to separate flowback streams that also reduces rig up time, is operationally autonomous (e.g., able to operate unmanned), and improves overall system safety.

SUMMARY OF DISCLOSURE

Embodiments disclosed herein relate generally to single skid separation systems that may include a mobile member having an operations section and process section. The operations section may include a planar (e.g., generally flat) surface. There may be an inlet separator (e.g., a three-phase separator or a solid separator) disposed on the process section that may be configured to receive a stream (e.g., a waste or flowback stream) from a source (e.g., a wellbore). The inlet separator can separate the stream into a first lights stream and a first heavies stream. The system may optionally include a heater (e.g., a line heater) that can also be disposed in the process section, and the heater may be in fluid communication with the inlet separator to receive and heat the first lights stream. There may also be a second separator (e.g., a three-phase separator or a solid separator) disposed in the process section, in fluid communication with the heater and/or the inlet separator and configured to receive the first lights stream. The second separator may be used to produce a second lights stream and a second heavies stream, and/or to measure any flash gas or similar components produced during separation operations (e.g., if the pressure of the stream is reduced when supplied to the second separator). Further aspects of the system may include a third separator (e.g., a three-phase separator or a solid separator) disposed in the process section, in fluid communication with the second separator for receiving the second heavies stream. The third separator may produce one or more of an aqueous stream, an organic stream, a vapor stream, and combinations thereof. The system can also include a signal capture and data acquisition (SCADA) system or similar monitoring and/or control system operatively connected therewith. The SCADA system may be configured to provide monitoring and autonomous operation of the single skid separation system. The SCADA system may be interfaced from a location on the mobile member and/or a remote location, and in various embodiments, the SCADA system can be used to enable remote or unmanned operation of the system.

Other embodiments of the disclosure may provide for methods of performing a separation process, where the method may include the steps of transporting a single-skid separation unit to a worksite; performing downhole operations at the worksite; recovering a waste stream (e.g., a waste stream resulting from performing the downhole operations) into the single-skid separation unit; and using the single-skid separation unit to separate the waste stream into at least one of an aqueous phase, an organics phase, and a gas phase.

Additional embodiments disclosed herein may provide for methods of using a mobile single skid unit to separate a flowback stream to produce one or more cleaned product streams. The method may include the steps of transporting the mobile single-skid unit to a worksite; performing one or more fracturing processes at the worksite, which may result in the production of a flowback stream; and recovering the flowback stream into the mobile single-skid unit. As described above, the mobile single-skid unit can include a mobile member having an operations section and process section, and the operations section may include a planar surface. There may be an inlet separator disposed on the process section that may be configured to receive the flowback stream from a wellbore disposed in the worksite, and the inlet separator may also be configured to produce a first lights stream and a first heavies stream. There may be a line heater also disposed on the process section, and the line heater may be in fluid communication with the inlet separator so that the line heater may receive and heat the first lights stream. There may be a second separator disposed on the process section, and the second separator may be in fluid communication with the line heater and/or the inlet separator, and the second separator may also be configured to receive the heated first lights stream. The second separator may be further configured to produce at least a second lights stream and a second heavies stream. The unit may include a third separator disposed on the process section, which may be in fluid communication with the second separator. In addition, the third separator may be configured to receive the second heavies stream, and may also be configured to produce one or more of the aqueous stream, the organic stream, the gas stream, and combinations thereof. Furthermore, the unit may include a signal capture and data acquisition (SCADA) system operatively connected with the mobile separation unit, and the SCADA system may be configured to provide monitoring and autonomous operation of the unit. The SCADA system may be interfaced from a location on the mobile member.

Other aspects and advantages of the disclosure will be apparent from the following description and the appended claims.

DETAILED DESCRIPTION

Figure 1:
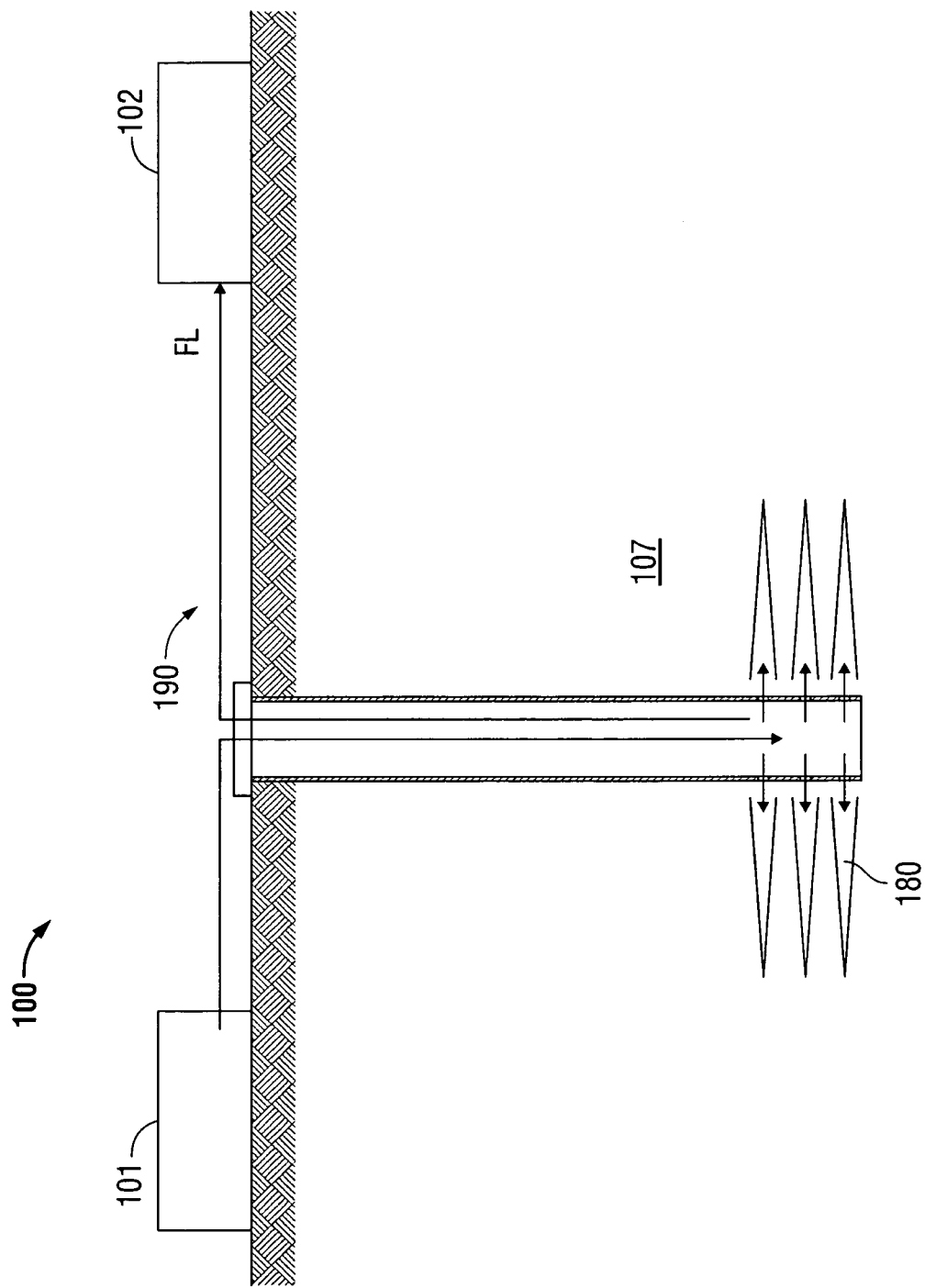
FIG. 1 depicts a diagrammatic views of conventional fracturing fluid injection and flowback recovery processes.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

In addition, directional terms, such as "above," "below," "upper," "lower," "front," "back," etc., are used for convenience in referring to the accompanying drawings. In general, "above," "upper," "upward," etc. refer to a direction toward the Earth's surface, but is meant for illustrative purposes only, and the terms are not meant to limit the disclosure.

Figure 2:
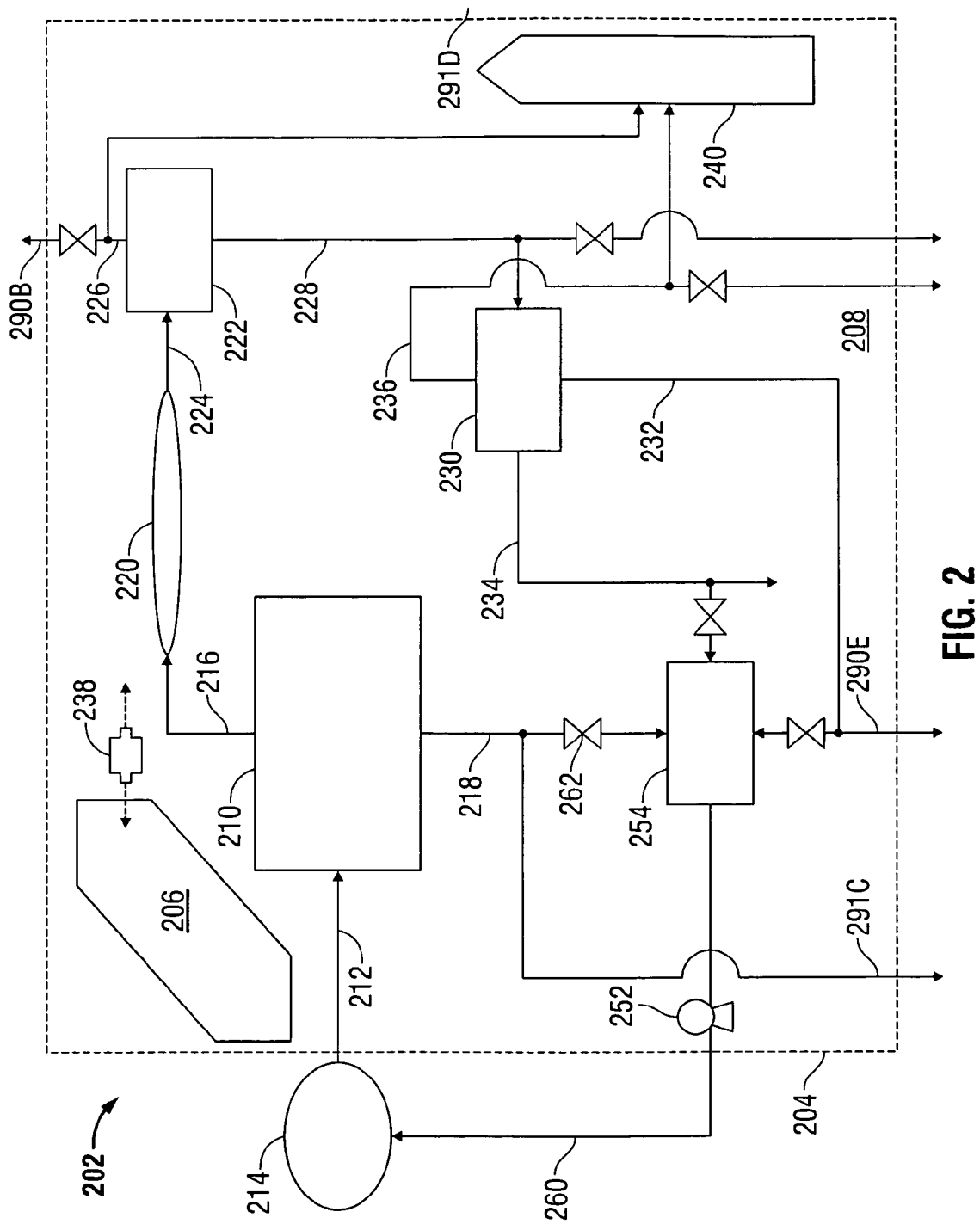
FIG. 2 depicts a schematic block diagram of a process usable with a single skid separation system, in accordance with embodiments of the present disclosure.

Referring now to FIG. 2, an overall process view of a schematic block diagram of a single skid separation system 202, according to embodiments of the present disclosure, is shown. FIG. 2 illustrates the separation system 202 having a number of interacting operable sections, such as, for example, an operations section 206, which can be used to control and/or monitor the system 202, and a process section 208, which can perform various processes (e.g., separation operations) on a flowback stream. The operations and process sections (206, 208) may include any number of components, subcomponents, and/or systems associated therewith, any of which may be interchangeably connected with each other within the system 202.

The system 202 may include a mobile member 204 that can be configured to include (e.g., contain and/or carry) both the operations section 206 and the process section 208 associated therewith. For example, in an embodiment, the mobile member 204 can be a towable trailer, a truck, or another type of mobile and/or transportable vehicle or surface. The operations section 206 can include a planar surface (not shown) to provide the system 202 with a level surface to aid assembly and operation thereof. It will be understood that additional components can be added to the skid system 202 without exceeding the single skid concept. The mobile member 204 may be equipped with a full belly pan to prevent spilled fluids from contacting the ground.

Other equipment usable with system 202 may include, for example, one or more high pressure and/or high volume pumps (typically powerful triplex, or quintiplex pumps) and/or a monitoring unit. Any of the equipment may be configured or designed to operate over a wide range of pressures and injection rates, and may exceed pressure ratings of 15,000 psi and working capacities of 100 barrels per minute.

The depicted system is shown coupled with an external source 214 (e.g, a producing subterranean formation, a wellhead, etc.), such that the source 214 can provide a feed stream 212 to the system 202. In an embodiment, the feed stream 212 may be a flowback fluid stream recovered from a formation upon completion of a fracturing process.

Figure 3:
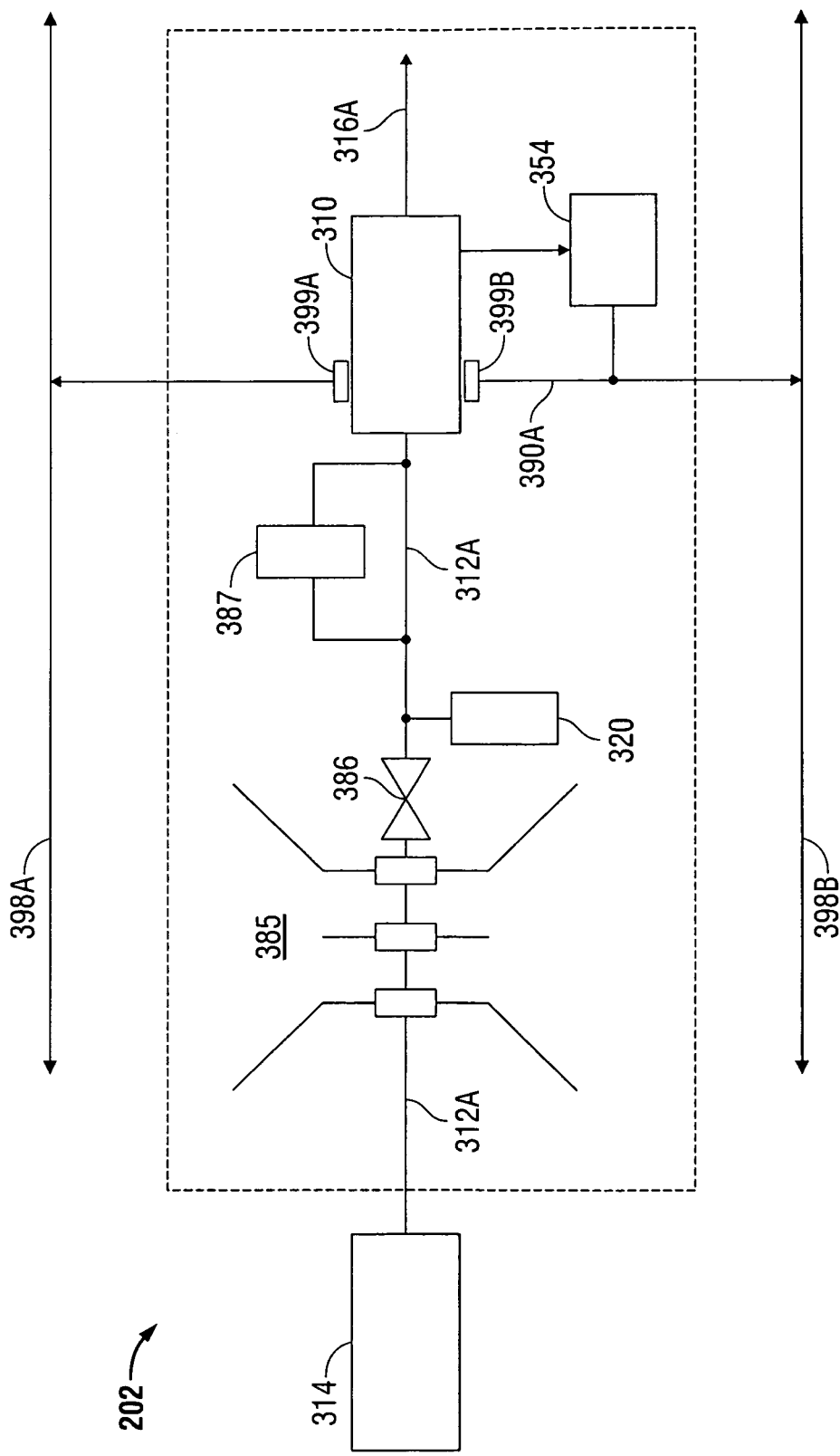
FIG. 3 shows a diagrammatic view of a feed stream entering into the system of FIG. 2, in accordance with embodiments of the present disclosure.

Referring briefly to FIG. 3, a diagrammatic view of a feed stream 312A flowing from a source 314 into a skid system 202, according to embodiments of the present disclosure, is shown. As illustrated, the feed stream 312A may initially pass through a tree or manifold 385, choke 386, filter 387, and/or other similar components, any of which may be usable to facilitate the selective distribution of the feed stream 312A through the system 202. In an embodiment, the distribution of the feed stream 312 through the system 202 can be performed in a predetermined in a manner that optimizes the overall operation of the system 202.

The inlet manifold 385 may be, for example, rated at 15,000 psi and may also include one or more valves that enable changes in the direction of flow for directing the feed stream 312A to individual pieces of equipment. The choke 386 may be used to control the feed stream flow rate, and may also be used to reduce the pressure of the feed stream 312A to a level that does not exceed the working flow capacity and pressure of the operational equipment within the system 202. A sand catcher or other type of filter 387, which can include any manner of separation apparatus, can be used to protect the equipment within the system 202 from abrasive materials entrained within the feed stream 312A. In some embodiments, the filter 387 may be connected upstream of the manifold 385 and/or the choke 386. As such, the depicted components and arrangement thereof is intended to be exemplary and non-limiting.

The choke 386 depicted in FIG. 3 can be representative of an assembly that includes any number and arrangement of chokes, valves, and interconnecting piping, as would be apparent to one of ordinary skill in the art. At least some of the chokes and valves of the assembly may be hydraulically operated. A heater 320, such as a line heater configured with high-pressure coils, may also be included, upstream of the choke 386, downstream thereof, or both. As such, the system 202 may include one or more heaters 320 operably connected therein.

The manifold 385, the choke 386, and/or other components may be fluidly connected with one or more separation devices within the system 302. As shown in FIG. 3, the manifold 385 and the choke 386 may be connected in series with an inlet separator 310. The inlet separator may be used to separate one or more liquid and/or gas components from the heavies or other solids entrained within the feed stream 312A. The inlet separator 310 may use baffles and/or gravity to aid the removal of solids from the feed stream 312A to produce a separated stream 316A (e.g., a first lights stream). The inlet separator 310 may be sized to allow adequate retention time to facilitate gravity separation of solid particles from the liquid and gas phases, as would be known to one of ordinary skill in the art.

The separator 310 may be configured with one or more dump lines 390A, which may be fluidly connected with one or more containers, such as a tank 354. Periodically, inlet separator 310 may require a solids discharge through one or more dump or discharge lines, or to a holding vessel (not shown), or to the tank 354. In one embodiment, the tank 354 can include a mixer. In another embodiment, the separator 310 may be a fuel gas separator configured with an independent dump that may keep a dry fuel gas readily available for use as a utility within the system 202.

Any of the components within the system 202 may be configured with a pressure relief device (PRD) 399A. In an embodiment, the PRD may be a valve configured to relieve the internal vessel pressure in the event a preselected pressure limit is exceeded. The PRD may be connected to a discharge line or header 398A, which may be used for the removal of the gas and/or other components to reduce the pressure within the system 202.

In addition to gas pressure relief, any of the components within the system 202 may be configured to relieve liquid pressure. As such, there may be one or more drains 399B or similar features provided on or in communication with any of the components. The drains 399B and any connected nozzles, piping, and/or similar components may be configured for the transport or relief of liquid, as well as slurry-based solid streams. Any of the drains 399B may be connected to a common liquid header 398B, as would be known to one of ordinary skill in the art. The headers 398A and 398B may serve as a conduit for the transfer of fluids or fluid-based streams to other components of the system 202, external or outlet waste streams, or to portions of a recycle/remixing section. Use of autonomous devices such as the PRD 399A and/or drains 399B to relieve pressure without requiring human intervention can facilitate unmanned operation of the system 202.

Referring again to FIG. 2, an inlet separator 210 is shown disposed in the process section 208, to receive the feed stream 212 from the external source 214. The inlet separator 210 may be connected to the source, such as the wellhead outlet (not shown), and/or with other equipment or other equipment within the system 202. In an embodiment, the feed stream 212 may include injected fracturing fluids recovered from the source 214 (e.g., a flowback stream).

The inlet separator 210 may be used to separate particulate or other heavy contaminants from fluid streams that flow into the separator 210. For example, the inlet separator 210 may include a sand separator that separates sand or other solids from water and/or other fluids. The system 202 may include one or more sales lines, such as a liquid sales line 290E and/or a gas sales line 290B, as well as one or more waste streams 291C, 291D, any of which can be in fluid communication with the inlet separator 210 and/or other components of the system 202. For example, a waste stream 291C is shown flowing from the inlet separator 210.

The inlet separator 210 may be configured to perform an initial separation operation on the feed stream 212, to yield and/or produce a first lights stream 216 and a first heavies stream 218. In an embodiment, the first lights stream 216 may be an overheads stream, and the first heavies stream 218 may be a bottoms stream. For example, the first heavies stream 218 leaving the inlet separator 210 may include water and organics. The desired composition of the first lights and heavies streams 216, 218 can be controlled by the sizing of the inlet separator 210 and/or other features thereof, as would be known to one or ordinary skill in the art.

In some embodiments, the inlet separator 210 may utilize centrifugal force to separate sand and/or other heavy particles out of the liquid phase. Separated solid material may settle by gravity to the bottom of the separator 210, and eventually drop or flow into a tank or reservoir 254, through a choke 262, valve, or similar control device, whereby the heavies portion may thus be separated and stored, as desired. Fluids can enter the inlet separator 210 via a tangential entry path, whereby centrifugal forces may result in relatively heavier solids entrained in the fluids to migrate to an outer periphery of the separator 210 to gradually fall to the tank 254 or a discharge line. In an embodiment, materials from the tank 254 can be returned to the external source 214 as a return stream 260, through any manner of valve, choke, heater, measurement device, or regulator 252. Additionally or alternatively, the tank 254 can be removed, replaced, and/or emptied through other means known in the art.

In operation, the fluid from source 214 may enter the system through a manifold (385, FIG. 3) and/or a choke (386, FIG. 3), and then pass into the inlet separator 210. In the inlet separator 210, any gas present within the feed stream 212 may be separated from the heavies (liquids and solids) portion. The separator 210 may be configured with a heater element or other comparable device that may be activated or used to enhance separation. In an embodiment, the feed stream 212 may be heated by direct mixing with additives, such as hot water. In other embodiments, the separator 210 or conduits communicating therewith may include a backup dump valve (not shown) usable to counteract heavy flow rates of the feed stream 212 to the system 202 and/or separator 210 that could exceed the capacities thereof.

In an optional embodiment, one or more heaters 220 (e.g., line heaters) may be used to exchange or otherwise transfer heat to any of the streams within the system 202. FIG. 2 depicts a heater 220 in fluid communication with the inlet separator 210, e.g., within the process section 208 of the system 202 for receiving and heating the first lights stream 216 produced by the separator 210.

Figure 4:
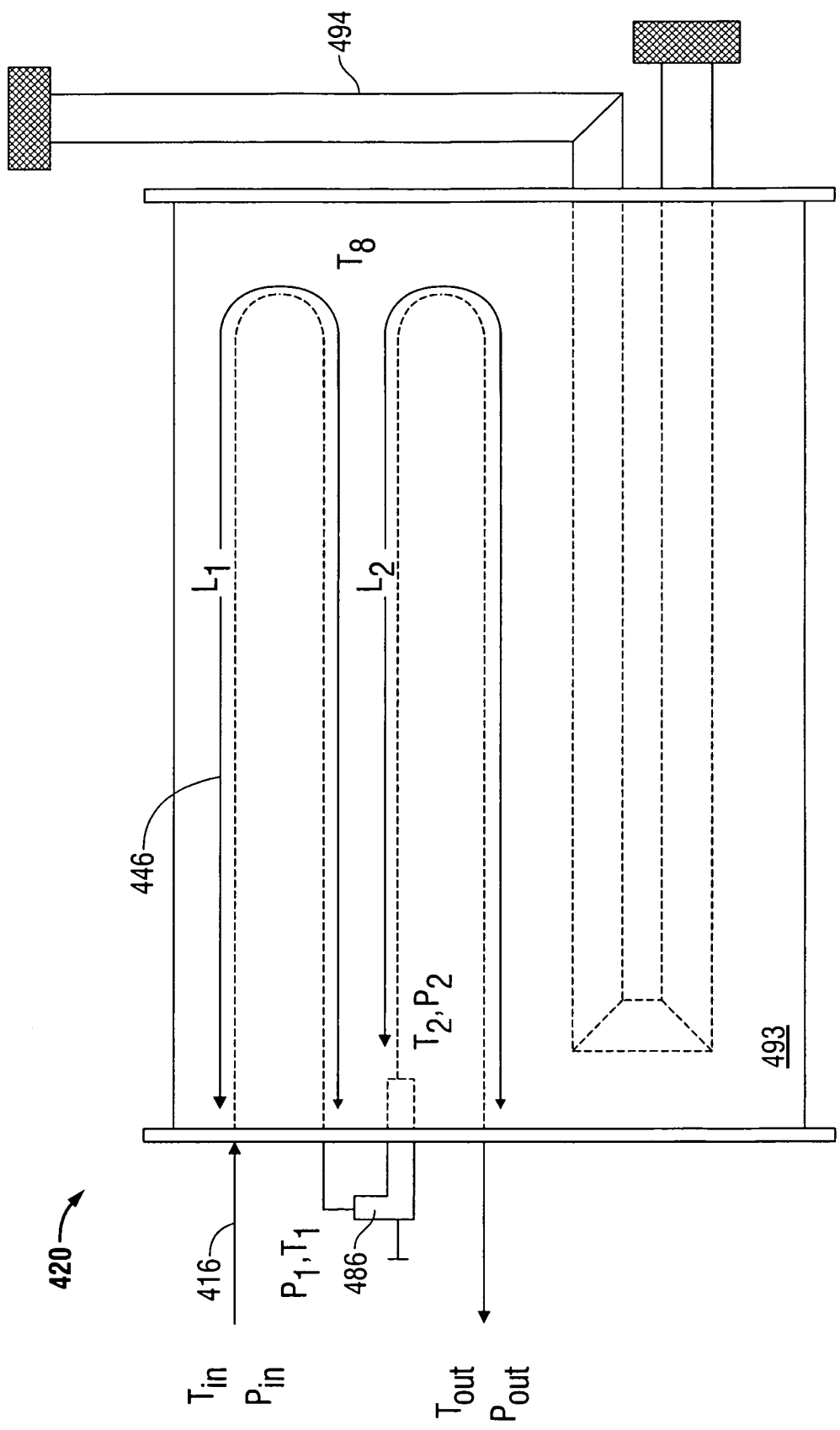
FIG. 4 shows a diagrammatic view of flow through a line heater usable within the system of FIG. 2, in accordance with embodiments of the present disclosure.

Referring briefly to FIG. 4, a line heater 420 usable within the skid system 202 according to embodiments disclosed herein, is shown. As illustrated, an inlet stream 416 may enter into the heater 420 at an applicable temperature Tin and pressure Pin. In some embodiments, the line heater may include one or more coils 446, such as high-pressure coils.

The heater 420 may include one or more high-pressure coils 446 of a desired length L1, L2 that may heat the inlet stream 416 to a desired temperature T1, which can correspondingly change the pressure P1 of the inlet stream 416. Although not necessary in some operations, in an embodiment, the flow stream may pass through a restrictor or choke valve 486, or otherwise be caused to decrease in pressure P2, which may change the temperature T2 of the flow stream.

One or more of the coils 446 may be immersed in a fluid medium 493, such as water, having a selected temperature T8 which may be usable to transfer heat. As such, the fluid medium may be heated by, for example, a heated tubular 494 that may be positioned in the fluid medium 493 with the coils 446, whereby the tubular 494 may provide a heat flux or temperature gradient suitable to heat the fluid medium 493. As would be apparent to one of ordinary skill in the art, the fluid medium 493 may exchange heat by way of convection and/or conduction to the fluid stream 416 and/or the coils 446. In other embodiments, temperature gradients within the heater 420 may result from engine exhaust or heat generated by electrical devices and/or other components within the system. When water is used as the fluid medium, the water temperature may be heated in the range of about 180° F. to 210° F. to avoid boiling. If other temperatures are required, additives, such as glycol, may be added to the water, or other fluid mediums may be used.

In order to adequately size the heater 420, the heat duty, the size of the tube 494, the size of the coil 446, wall thickness, the coil length(s), and/or other characteristics thereof may be varied as necessary to provide the desired design, capacity, and/or capabilities. In one embodiment, the size of the coil (e.g., length, width, diameter, etc.) may depend on the volume of fluid flowing through the coil, and the required heat duty.

There may be instances where the heater 420 may only include a single coil, in which case, heat may be added solely downstream or upstream of the choke 486, depending on the position of the coil relative thereto. Independent of the specific configuration of the heater 420, the final temperature Tout and pressure Pout of the inlet stream 416 is changed as a result of the heat exchanged therein.

Referring again to FIG. 2, the system 202 is further shown having a second separator 222 disposed in the process section 208, in fluid communication with the heater 220. The second separator 222 may be configured to receive the first lights stream 216, or the heated first lights stream 224, if heated by the heater 220. The second separator 222 may separate components of any streams sent thereto, which may result in formation of a second lights stream 226, as well as a second heavies stream 228.

In various embodiments, the heater 220 may be used to control the temperature and/or operation of the second separator 222. The design of the second separator 222 may be determined by anticipated flow stream composition, flow stream temperature, operating temperature, or other features of the second separator 222, and/or other similar circumstances. The second separator 222 may also be designed or otherwise configured to control and/or measure the produced overhead vapor pressure of the second lights stream 226.

From the second separator 222, the second light stream 226 can be transported to a burner 240 and/or to a sales pipeline, a gas header (398A, FIG. 3), etc. Similarly, the second heavies stream 228 can be transported to a third separator 230, sales line, waste stream, liquid header (398B, FIG. 3), etc. The third separator 230 may be in fluid communication with the second separator 222, as shown, and can receive the second heavies stream 228 as a feed stream thereto; however, the source of feed stream for the third separator 230 is not limited to that from the second separator 222, and it should be noted that other inlet feed stream connections are possible. For example, the third separator 230 may be in fluid communication with the inlet separator 210 and/or the heater 220.

In some embodiments, the third separator 230 may be configured as a three-phase separator, as would be known to one of ordinary skill in the art. Thus, the third separator 230 may be operated to produce or yield an aqueous stream, a hydrocarbon or organics stream, a vapor stream, or combinations thereof.

As would also be apparent to one of ordinary skill in the art, the third separator 230 (or any of the separators of system 202) may be configured with internal baffles, weirs, and/or boots, any of which may be used to help maintain control mechanisms of the system 202 in operable condition. The internal components (not shown) may also be designed to aid separation of the separator feed streams (e.g., stream 228) into various phases. For example, the internal components (e.g., baffles, etc.) of the third separator 230 may aid the production of an aqueous stream, an organic stream, and a gas stream from the separator 230.

The third separator 230 may be sized to allow adequate retention time to facilitate gravity separation of the liquid phases. The third separator 230 may also include level control valves or other valves configured to transfer or divert the various liquid components in liquid streams 232 and/or 234 to the liquids sales line, disposal line, header, one or more tanks or vessels, etc. A gas or lights stream 236 (e.g., a third lights stream) may exit the third separator 230 and be flowed to the gas sales line or to a waste stream. In some embodiments, the third lights stream may be sent to a flare or burner 240.

The third separator 230 may be configured to separate the stream 228 into multiple product streams. The flow streams 232 and 234 containing liquid phase(s) from the third separator 230 may be dumped to a liquid header (not shown) that may allow the direction of flow to be changed, the applications of which may vary with each operation. The gas stream 236 may be measured, and also diverted to tanks (not shown). If desired, such as when there are large amount of flash gas present, the gas stream 236 may be sent to a burner 240 and/or measured.

Accordingly, FIG. 2 illustrates that the mobile member 204 may be configured with a burner or flare 240 disposed on the process section 208. The burner 240 may be configured to ignite vapors received from at least one of the first lights stream 216, the second lights stream 226, the third lights stream 236, or combinations thereof.

To enhance the mobility of the system 202, the burner 240 may be configured to move between a prone position and a standing position. When in the prone position, the burner 240 may be oriented in a parallel manner with respect to a planar surface of the processing section 208. Placement of the burner 240 in a prone position facilitates stowage and securing of the burner 240 to provide the mobile member 204 with greater mobility and safety when moving between locations. In an embodiment, the burner 240 can be raised and lowered using a rope and pulley system (not shown in FIG. 2).

The burner 240 (e.g., stack or flare) may be used to treat or otherwise eliminate waste gas that may not be feasible for use or transport. The burner 240 may also be part of an overall safety system used to burn gas released via one or more PRDs (399A, FIG. 3) to decrease strain on equipment. As such, the burner 240 may be used to protect any of the processing equipment used within the system 202. The burner 240 may also be used during times of upsets, which can result in the release of large quantities of gas, often exceeding the design capacity of equipment. During normal operation, any vented gas may be collected by a header line (398A, FIG. 3), and subsequently passed to the burner 240.

FIG. 2 further shows the system 202 including a signal capture and data acquisition (SCADA) system 238, or a similar monitoring and/or control system operatively connected therewith, which may thus be used in conjunction with the overall operation of the system 202. The SCADA system 238 may include any manner of industrial control systems or other computer control systems that monitor and control operation of the system 202. In one embodiment, the SCADA system 238 may be configured to provide monitoring and autonomous operation of the system 202.

The SCADA system 238 may be interfaced from any location on the mobile member 204, such as from an interface terminal (not shown). In an embodiment, the SCADA system 238 can be interfaced and/or controlled from the operations section 206. Additionally or alternatively, the SCADA system 238 may be interfaced remotely, such as via an internet connection that is external to the mobile member 204. A usable internet interface may include a viewer or other comparable display device, whereby the viewer may display real-time system performance data. In other embodiments, the SCADA system 238 may be able to transfer data to spreadsheet software, such as Microsoft Excel. The data may be related to pressure, flow rate, fluid levels, and/or other similar operational characteristics of the system 202.

The operations of the system 202 may utilize a number of indicators or sensors, such as sight glasses, liquid floats, temperature gauges or thermocouples, pressure transducers, etc. In addition, the system 202 may include various meters, recorders, and other monitoring devices, as would be apparent to one of ordinary skill in the art. These devices may be utilized to measure and record data, such as the quantity and/or quality of the organic phase(s), the liquid phase(s), and the vapor or gas produced by the system 202.

The SCADA system 238 may provide an operator or control system with real-time information regarding the performance of the system 202. It should be understood that any components, sensors, etc. of the SCADA system 238 may be interconnected with any other components or subcomponents of the system 202. As such, the SCADA system 238 can enable on-site and/or remote control of the system 202, and in an embodiment, the system 202 can be configured to operate without human intervention, such as through automatic actuation of the system components responsive certain measurements and/or conditions and/or use of passive emergency systems.

The system 238 may be configured with devices to measure "HI" and/or "LOW" pressure or gas flow rates. The use of such information may be useful as an indication of whether use of a compressor in conjunction with a flare operation is necessary, or as an indication for determining whether the gas flow rate to the flare should to be increased or decreased. The system 238 may also be coupled with fire, pressure, and liquid level safety shutdown devices, which may be accessible from remote locations, such as the wellhead (not shown).

The SCADA system 238 may include a number of subsystems, such as a human-machine interface (HMI). The HMI may be used to provide process data to an operator, and as such, the operator may be able to interact with, monitor, and control the system 202. In addition, the SCADA system 238 may include a master or supervisory computer system configured to gather and acquire system data, and to send and receive control instructions, independent of human interaction. A remote terminal (RT) may also be operably connected with various sensors. In an embodiment, the RT may be used to convert sensor data to digital data, and then transmit the digital data to the computer system. As such, there may be a communication connection between the supervisory system to the RT's. Programmable logic controllers may also be used.

Data aquistion of the system 202 may be initated at the RT and/or PLC level, and may include, for example, meter readings, equipment status reports, etc., which may be communicated to the SCADA 238 as required. The acquired data may then be compiled and formatted in such a way that an operator using the HMI may be able to make command decisions to effectively run the system 202 at great efficiency and optimization.

For example, all operations of the system 202 may be monitored in a control room within the operations section 206. In an embodiment, the operations section 206 may be mounted on the neck of a trailer. Alternatively or additionally, the system 202 can be operable remotely and/or automatically.

Figure 5A:
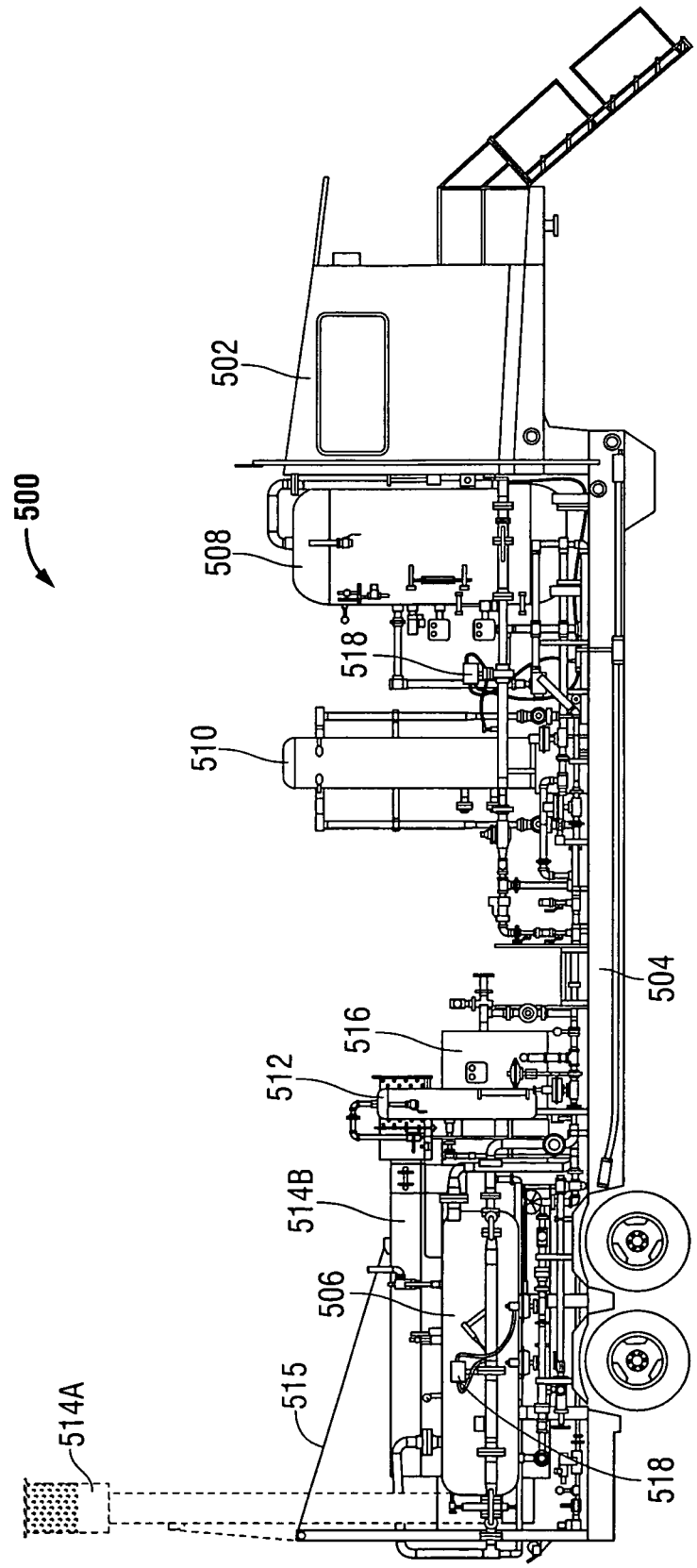
FIG. 5A depicts a diagrammatic right side view of a mobile skid system, in accordance with embodiments of the present disclosure.
Figure 5B:
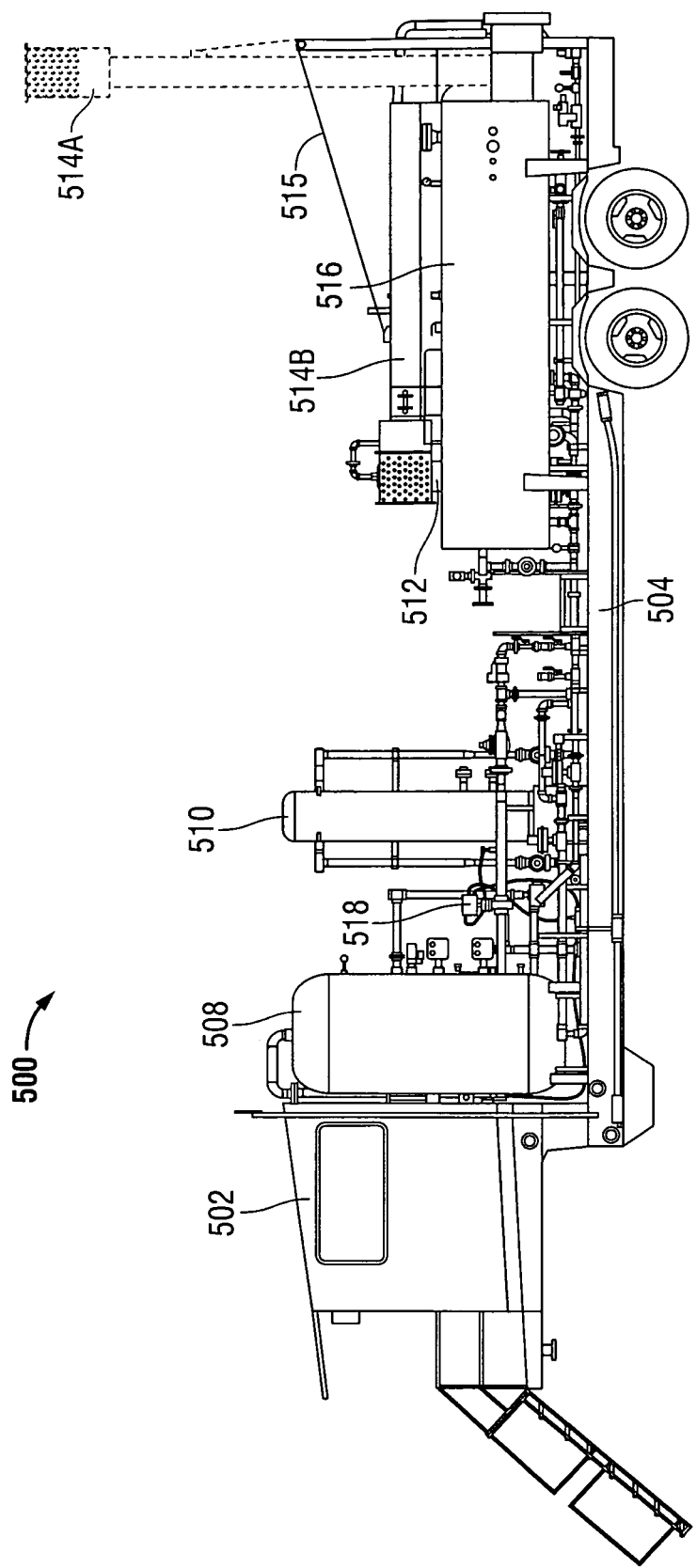
FIG. 5B depicts a diagrammatic left side view of the mobile skid system of FIG. 5A.
Figure 5C:
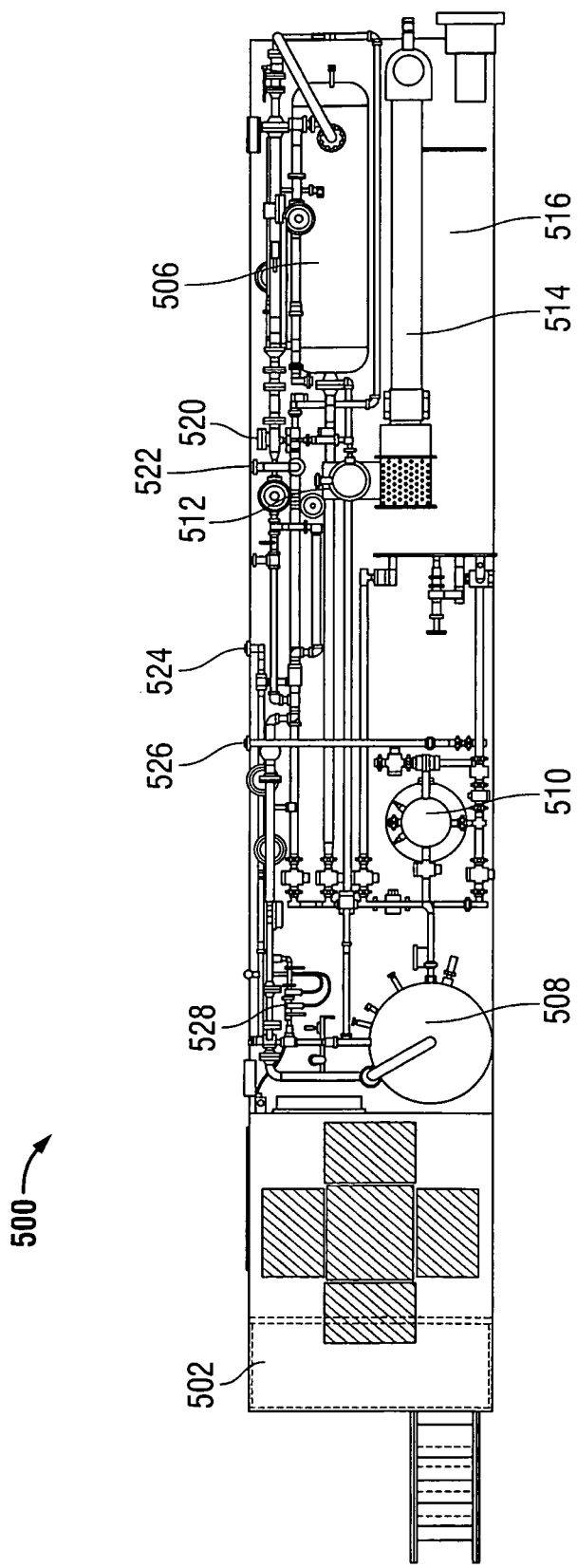
FIG. 5C depicts a diagrammatic top plan view of the mobile skid system of FIGS. 5A and 5B.

Referring now to FIGS. 5A through 5C, an embodiment of a mobile skid system 500 usable within the scope of the present disclosure is shown. Specifically, FIGS. 5A and 5B show right and left side views of the system 500, respectively, while FIG. 5C depicts a top plan view of the system 500.

As described previously, the embodiments of system 500 can include various separators. For example, a first three-phase separator 506 is shown, which can be configured to receive an input stream (e.g., a flowback stream) at a high pressure. A second three-phase separator 508 can be used to receive one or more streams from the first three-phase separator 506 at a lower pressure, and can be provided in communication with a measurement device 528 for measuring gas, oil, water, or other fluids flowing to and/or from the second three-phase separator 508. Gas separated from flow streams within the system 500 can be transported and/or released using one or more gas outlet ports 520. Similarly, water can be flowed into or from the system 500 and/or otherwise controlled using a water valve or port 522, and oil can be flowed into or from the system 500 using an oil valve or port 524. As described previously, gas, oil, and/or water can be flowed from the system 500 into tanks, header lines, sales lines, or similar vessels and/or conduits.

The system 500 is also shown including a sand separator 510, which can be use to separate solids (e.g., sand and/or other entrained particles) from one or more flow streams within the system 500. Separated sand and/or other solids and/or slurries can be removed from the system via a dump port 526. The depicted embodiment is further shown including a line heater 516, usable to heat flow streams received from the first three-phase separator 506 and/or other streams within the system 500, and a burner 514, which can be raised to position 514A and lowered to position 514B, such as through use of a rope and pulley system 515, proximate to a gas scrubber 512, for use processing, measuring, and/or flaring excess gas removed from one or more flow streams.

It should be understood that the depicted embodiment is merely exemplary, and that various types and quantities of separators and other components can be connected, as needed, to effectively separate and process a desired input stream, and provided with any manner of gauges and/or other measurement devices.

Each of the separators 506, 508, 510, the line heater 516, burner 514, gas scrubber 512, and all conduits necessary to interconnect these components, as well as each of the external valves and/or ports 522, 524, 526, can be provided on a single mobile member 504, which is depicted as a movable trailer.

SCADA monitoring devices 518 are also shown in association with various system components; however, it should be understood that control and/or monitoring devices can be provided in association with any portion of the system 500 and can be controlled on-site, such as through use of controls within the operations section 502, which is shown as a cabin area within the movable trailer having solar panels thereon, remotely (e.g., via an interne interface), and/or automatically, such as through use of automated controls that operate responsive to predetermined conditions, coupled with emergency systems to automatically cease operation of certain components if needed.

Embodiments disclosed herein thereby include systems and methods for performing a separation process, that require only a single mobile member, having most or all of the equipment necessary for the separation process operably interconnected upon arrival. As such, rig-up and disassembly times for the present system can be far less than conventional systems, which can require a full day or longer to assemble. Embodiments described herein can be assembled and used in 75% less time than that required to rig up a conventional system. Further, the transportation time and costs associated with a single-skid unit are drastically reduced when compared with those associated with conventional flowback recovery operations.

Embodiments disclosed herein can also provide for continuous, real-time monitoring, enabling efficient control of the system from an on-site location and/or a remote location. The system can also be configured for autonomous, unmanned operation, providing a significant savings in cost and manpower.

Embodiments disclosed herein may beneficially provide well testing and other operations, using a single-skid unit that does not require a series of trailers or trucks to be connected together on location. This provides a safer system by minimizing piping between high-pressure equipment. Of additional benefit, flash gas may be readily measured, and fluids may be separated more efficiently and accurately. The single skid mobile unit may be cost-effectively deployed, and may provide all necessary unit operations to treat flowback streams on a single unit, which provides a tremendous over the use of a sizeable train of trucks at a work site. Reduced truck traffic can reduce the risk of transportation related accidents, accidental discharges, as well as wear and tear on highways and local roads.

Of additional benefit, the systems, units, and methods of the present disclosure are not limited to fracturing recovery, and hence may be used for any number of separation and recovery processes.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:
1. A system comprising:
   a single-skid separation unit comprising a mobile member, wherein the mobile member comprises, an operations section and process section, wherein the operations section comprises a planar surface;
   an inlet separator disposed on the process section configured to receive a flowback stream from a subterranean formation, wherein the inlet separator produces a first lights stream and a first heavy stream;

a second separator disposed on the process section, wherein the second separator is in fluid communication with the inlet separator and is configured to receive the first light stream, and wherein the second separator produces a second light stream and a second heavy stream;

a third separator disposed on the process section, wherein the third separator is in fluid communication with the second separator and is configured to receive the second heavy stream, and wherein the third separator produces at least one of an aqueous stream, a hydrocarbon stream, a vapor stream, or combinations thereof; and a signal capture and data acquisition system operatively connected with the operations section, wherein the signal capture and data acquisition system is configured to provide monitoring and autonomous operation of the system, and wherein the signal capture and data acquisition system is interfaced from a location on the mobile member, a remote location, or combinations thereof.

2. The system of claim 1, wherein the system is configured to receive a flowback stream into the inlet separator from a fracturing recovery process.

3. The system of claim 2, wherein the signal capture and data acquisition system comprises an internet interface.

4. The system of claim 3, wherein the internet interface further comprises sensors to determine pressure, flow rate, and fluid levels in real time and a viewer, and wherein the viewer displays real-time system performance data comprising pressure, flow rate, and fluid levels.

5. The system of claim 2, the system further comprising:
a burner disposed on the process section, wherein the burner is configured to ignite vapors received from at least one of the first lights stream, the second lights stream, and combinations thereof, and wherein the burner is configured to move between a prone position and a standing position relative to the mobile member.

6. The system of claim 5, wherein the prone position relative to the mobile member comprises a parallel orientation with respect to the planar surface.

7. The system of claim 1, further comprising a line heater, wherein the line heater comprises a plurality of high-pressure heating coils inside the line heater.

8. The system of claim 2, wherein the first separator comprises at least one internal baffle.

9. The system of claim 2, wherein the system comprises pumps to pressurize and reinject the aqueous stream, and wherein the aqueous stream is pressurized and reinjected into the subterranean formation.

10. The system of claim 9, wherein the system comprises pumps to pressurize and reinject the hydrocarbon stream, and wherein the hydrocarbon stream is pressurized and reinjected into the subterranean formation.

* * * * *